United States Patent
Schlenker

(10) Patent No.: US 12,440,935 B2
(45) Date of Patent: Oct. 14, 2025

(54) SELF-ALIGNING EXTENSION BLOCK ASSEMBLIES

(71) Applicant: Knight Industries & Associates, Inc., Auburn Hills, MI (US)

(72) Inventor: Robert Schlenker, Troy, MI (US)

(73) Assignee: Knight Industries & Associates, Inc., Auburn Hills, MI (US)

( * ) Notice: Subject to any disclaimer, the term of this patent is extended or adjusted under 35 U.S.C. 154(b) by 354 days.

(21) Appl. No.: 18/211,217

(22) Filed: Jun. 16, 2023

(65) Prior Publication Data

US 2024/0033866 A1   Feb. 1, 2024

Related U.S. Application Data

(60) Provisional application No. 63/394,025, filed on Aug. 1, 2022.

(51) Int. Cl.
*B23Q 3/06* (2006.01)

(52) U.S. Cl.
CPC ..................... *B23Q 3/06* (2013.01)

(58) Field of Classification Search
CPC .... B62D 65/026; B62D 65/06; E04F 21/0023
See application file for complete search history.

(56) References Cited

U.S. PATENT DOCUMENTS

| | | | |
|---|---|---|---|
| 6,061,890 A * | 5/2000 | Shashlo | B60J 5/0463 |
| | | | 29/434 |
| 8,132,310 B2 | 3/2012 | Suga et al. | |
| 2015/0013133 A1 | 1/2015 | Lee | |
| 2022/0033020 A1 | 2/2022 | Yokote et al. | |

FOREIGN PATENT DOCUMENTS

| | | |
|---|---|---|
| CN | 109333411 A | 2/2019 |
| CN | 110182280 B | 4/2021 |
| DE | 102010010627 A1 | 9/2011 |
| KR | 100507481 B1 | 8/2005 |
| KR | 100527997 B1 | 11/2005 |

* cited by examiner

*Primary Examiner* — Jason L Vaughan
*Assistant Examiner* — Amanda Kreiling
(74) *Attorney, Agent, or Firm* — Carlson, Gaskey & Olds, P.C.

(57) ABSTRACT

A work carrier assembly includes a frame for supporting a work object, and a clamp assembly fixed to the frame, which includes an extension block assembly including a perch bracket and a locator bracket. The locator bracket is pivotably engaged with the perch bracket, and a block is pivotably engaged with the locator bracket.

20 Claims, 7 Drawing Sheets

SELF-ALIGNING EXTENSION BLOCK ASSEMBLIES

CROSS-REFERENCED TO RELATED APPLICATION

This application claims priority to U.S. Provisional Application No. 63/394,025, which was filed on Aug. 1, 2022.

BACKGROUND

Work carriers may be used in an automobile assembly line or other production, assembly, or manufacturing settings for conveyance of a work object, such as vehicle door, to various stations in a processing line, such as an assembling station where a window glass and other parts are assembled with the door. During production of a vehicle, one may take the vehicle door off the vehicle body and from the assembly line to a remote assembly station. In the remote assembly station, the vehicle door is placed in the work carrier, on which other parts are assembled with the door.

SUMMARY

A work carrier assembly according to an example of this disclosure includes a frame for supporting a work object, and a clamp assembly fixed to the frame. The clamp includes an extension block assembly including a perch bracket and a locator bracket pivotably engaged with the perch bracket. A block is pivotably engaged with the locator bracket.

In a further example of the foregoing, the block includes a groove configured to receive an edge of the work object.

In a further example of any of the foregoing, the locator bracket pivots about a first axis, and the block pivots about a second axis different from the first axis.

In a further example of any of the foregoing, the locator bracket includes an L-shaped portion having a first plate portion substantially perpendicular to a second plate portion. The first portion is pivotably attached to the perch bracket, and the second portion pivotably receives the block.

In a further example of any of the foregoing, the first plate portion includes an opening, and the perch bracket includes a protrusion received in, and movable within, the opening to delimit the degrees of freedom of allowable pivot of the locator bracket relative to the perch bracket.

In a further example of any of the foregoing, the second plate portion includes a second opening, and the block includes a second protrusion received in, and movable within, the second opening, to delimit the degrees of freedom of allowable pivot of the block relative to the locator bracket.

In a further example of any of the foregoing, the work carrier includes a base assembly; and a slider assembly moveable linearly relative to the base assembly. The extension block assembly extends from the slider assembly.

In a further example of any of the foregoing, the perch bracket includes a base portion, a post portion above the base portion, and a wing portion extending from the base portion. The post portion pivotably receives the locator bracket.

In a further example of any of the foregoing, the block includes ultra high molecular weight polyethylene or cast urethane.

In a further example of any of the foregoing, the work carrier includes a base assembly and a slider assembly moveable linearly relative to the base assembly. The extension block assembly extends from the slider assembly.

A method for supporting a work object according to an example of this disclosure includes attaching a clamp assembly to a frame configured to support the work object. The method includes moving a slider assembly of the clamp assembly linearly such that an extension block assembly of the slider assembly self-aligns to receive an edge of the work object in a groove of a block. The extension block assembly includes a perch bracket and a locator bracket pivotably engaged with the perch bracket, and the block is pivotably engaged with the locator bracket.

In a further example of the foregoing, the work object is a door.

In a further example of any of the foregoing, the block includes a groove configured to receive an edge of the work object.

In a further example of any of the foregoing, the locator bracket pivots about a first axis, and the block pivots about a second axis different from the first axis.

In a further example of any of the foregoing, the locator bracket includes an L-shaped portion having a first plate portion substantially perpendicular to a second plate portion. The first portion is pivotably attached to the perch bracket, and the second portion pivotably receives the block.

In a further example of any of the foregoing, the first plate portion includes an opening, and the perch bracket includes a protrusion received in, and movable within, the opening to delimit the degrees of freedom of allowable pivot of the locator bracket relative to the perch bracket.

In a further example of any of the foregoing, the second plate portion includes a second opening, and the block includes a second protrusion received in, and movable within, the second opening, to delimit the degrees of freedom of allowable pivot of the block relative to the locator bracket.

A work carrier assembly according to an example of this disclosure includes a frame for supporting a work object and a clamp assembly fixed to the frame. The frame includes a base assembly, a slider assembly moveable linearly relative to the base assembly, and an extension block assembly extends from the slider assembly. The extension block assembly includes a perch bracket and a locator bracket. The locator bracket is pivotably engaged with the perch bracket about a first axis, and a block is pivotably engaged with the locator bracket about a second axis different from the first axis. The block includes a groove configured to receive an edge of the work object.

In a further example of the foregoing, the locator bracket includes an L-shaped portion having a first plate portion substantially perpendicular to a second plate portion. The first portion is pivotably attached to the perch bracket, and the second portion pivotably receives the block.

In a further example of any of the foregoing, the first plate portion includes an opening. The perch bracket includes a protrusion received in, and movable within, the opening to delimit the degrees of freedom of allowable pivot of the locator bracket relative to the perch bracket. The second plate portion includes a second opening, and the block includes a second protrusion received in, and movable within, the second opening, to delimit the degrees of freedom of allowable pivot of the block relative to the locator bracket.

These and other features may be best understood from the following specification and drawings, the following of which is a brief description.

DETAILED DESCRIPTION

This application relates generally to work carriers, and more specifically to work carriers that are self-aligning for supporting work objects. While a door is disclosed in some illustrative examples as the work object, other work objects will benefit from this disclosure.

Figure 1:
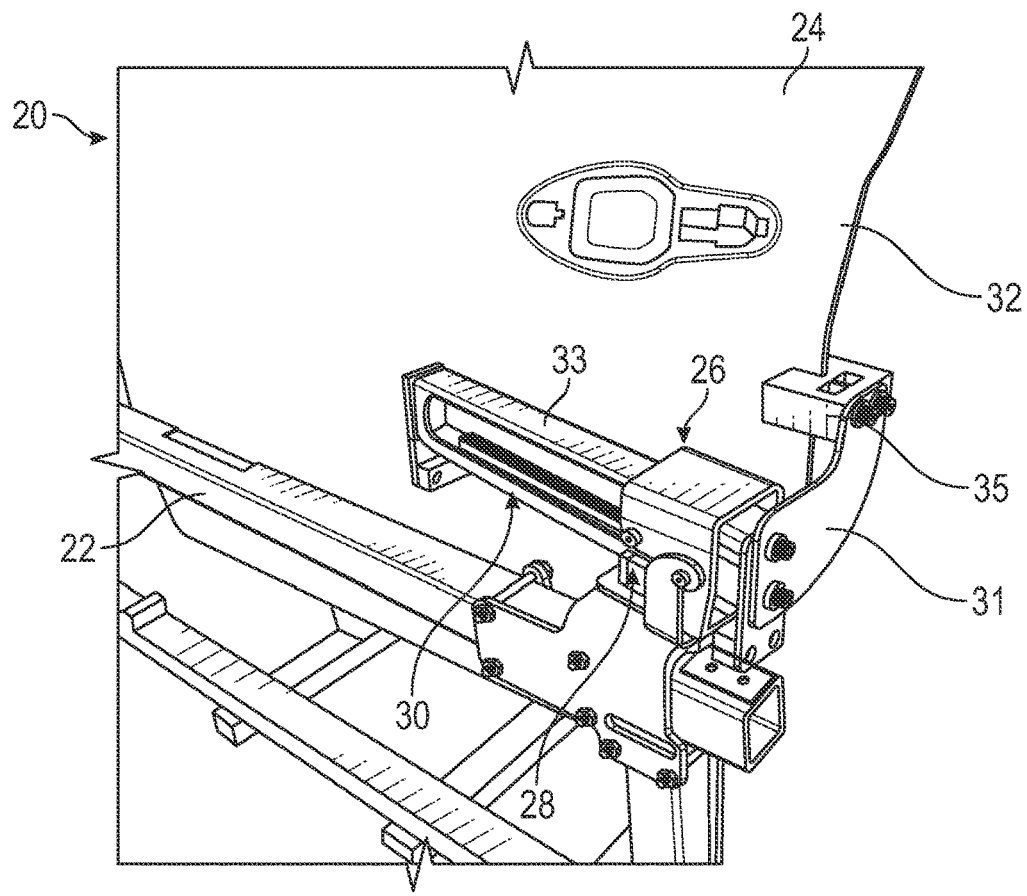
FIG. 1 illustrates an example work carrier assembly.

FIG. 1 illustrates a work carrier assembly 20 including a frame 22 for supporting a work object, the example being a vehicle door 24. A slidebox clamp assembly 26 is fixed to the frame 22 and includes a base assembly 28 mounted to the frame 22 and a slider assembly 30 slidably engaged with the base assembly 28.

An extension block assembly 31 extends from a housing 33 of the slider assembly 30 to engage an edge 32 of the vehicle door 24 for supporting the vehicle door 24. In some examples, the extension block assembly 31 provides a block 35 having a shape complementary in contour to the shape of an edge 32 of the vehicle door 24 so that the edge 32 can be received against the block 35, such as in one or more grooves for example. In some examples, the housing 33 may accommodate an extension block assembly 31 at either end such that it can be used in right-hand or left-hand applications. In some examples, the block includes ultra high molecular weight polyethylene or cast urethane.

Figure 2:
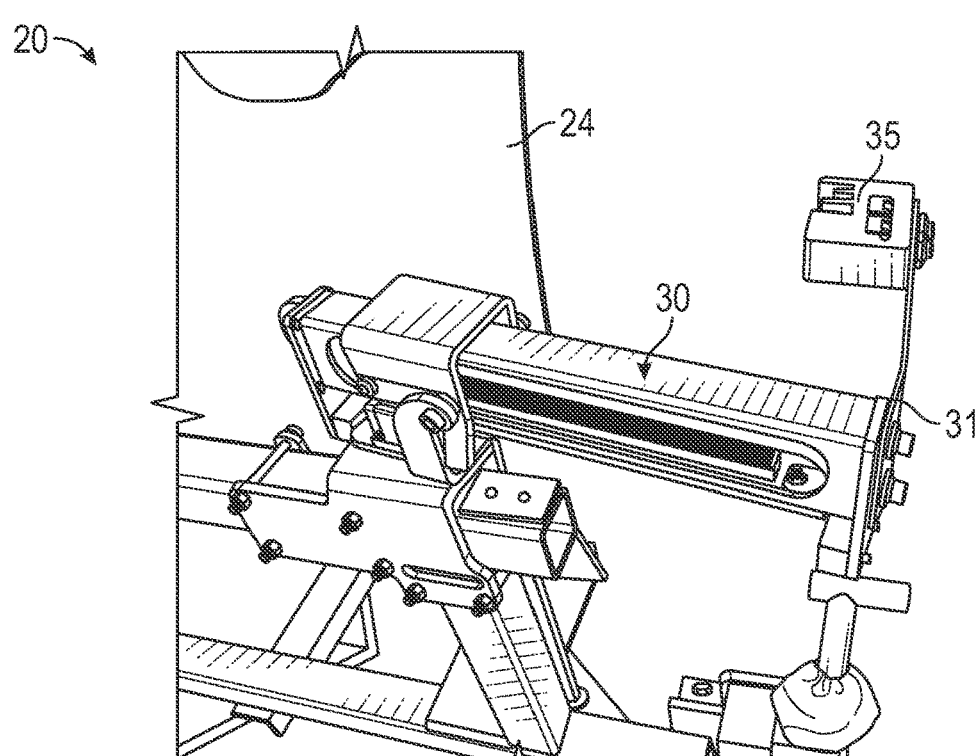
FIG. 2 illustrates another view of the example work carrier assembly of FIG. 1.

FIG. 2 illustrates another view of the example work carrier assembly 20, in which the slider assembly 30 is extended such that the block 35 is extended away from the edge of the vehicle door 24.

Figure 3:
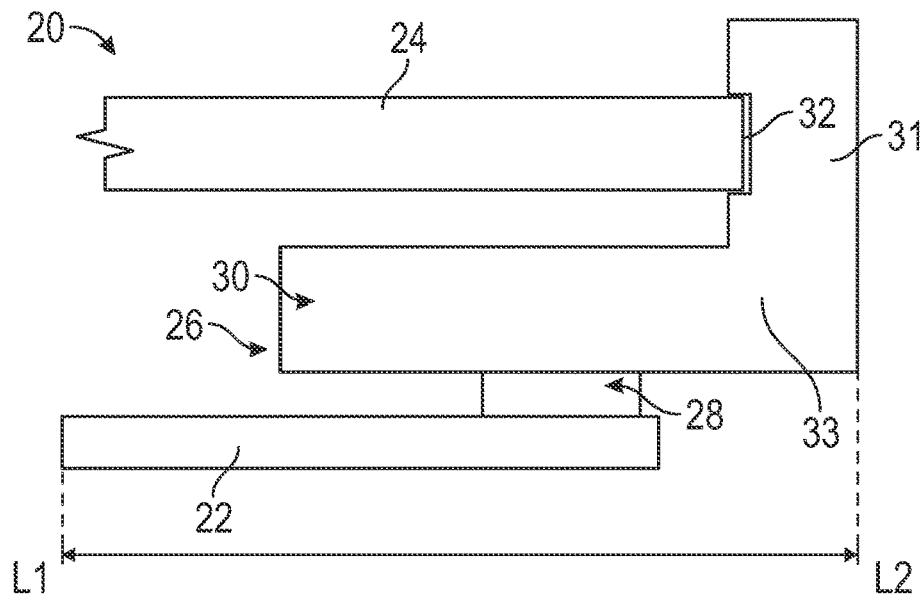
FIG. 3 schematically illustrates the example work carrier assembly of FIGS. 1 and 2.

FIG. 3 schematically illustrates a top view of example work carrier assembly 20, including the slidebox clamp assembly 26 supporting a vehicle door 24. The base assembly 28 is fixed to the frame 22, and the slider assembly 30 is moveable linearly relative to the base assembly 28. The example slider assembly 30 is moveable in the L1 direction until the extension block assembly 31 is received against the edge 32 of the vehicle door 24.

The example slider assembly 30 may include a mechanism to selectively prevent movement in the L2 direction, such that the vehicle door 24 is supported and prevented from moving in the L2 direction once the extension block assembly 31 is received against the edge 32. Other supports (not shown) may be provided on the frame 22 to provide supporting forces to the vehicle door 24 in other directions.

Figure 4:
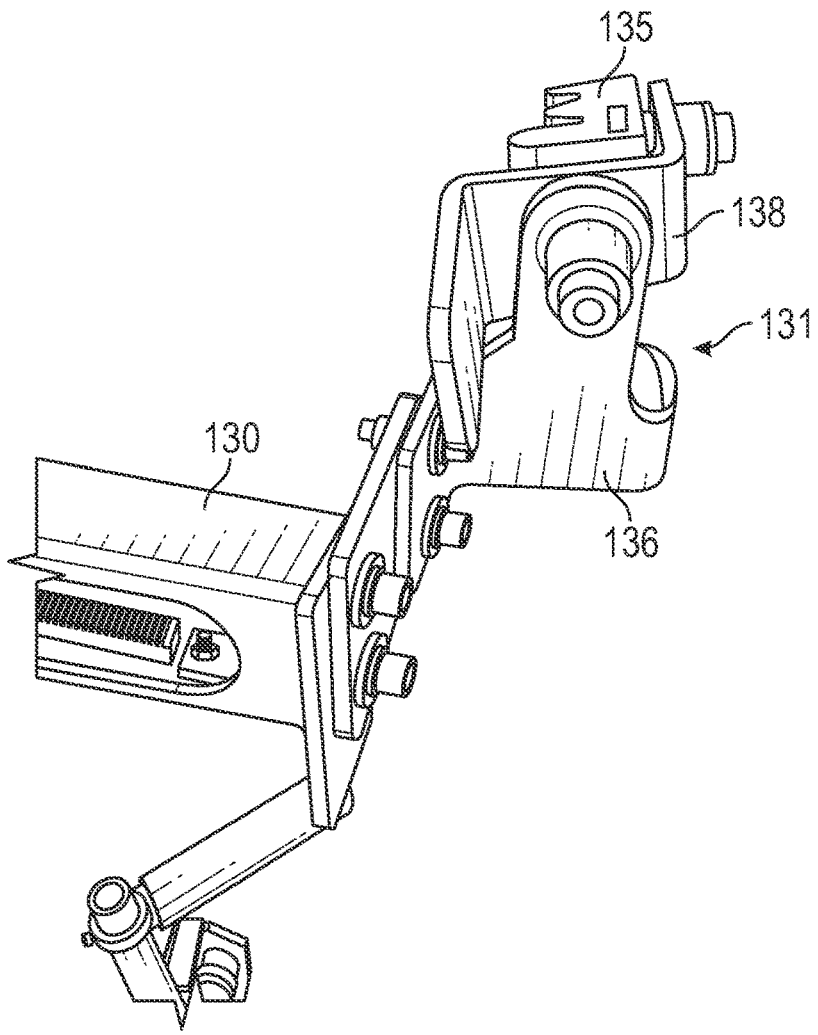
FIG. 4 illustrates an example self-aligning extension block assembly.

FIG. 4 illustrates an example self-aligning extension block assembly 131. It should be understood that like reference numerals identify corresponding or similar elements throughout the several drawings. The example extension block assembly 131 includes a perch bracket 136, and a locator bracket 138 pivotably attached to the perch bracket. A block 135 is pivotably attached to the locator bracket 138. The block 135 is configured to receive an edge of a door or other work object to hold the work object on a carrier assembly, such as the carrier assembly 20 shown in FIG. 1 in some examples. As discussed further below, the extension block assembly 131 is self-aligning in that the block 135 self-aligns to securely support the work object. In some examples, as shown, the extension block assembly 131 extends from, such as though attachment, a slider assembly 130 similar to the slider assembly 30 shown in FIG. 1.

Figure 5:
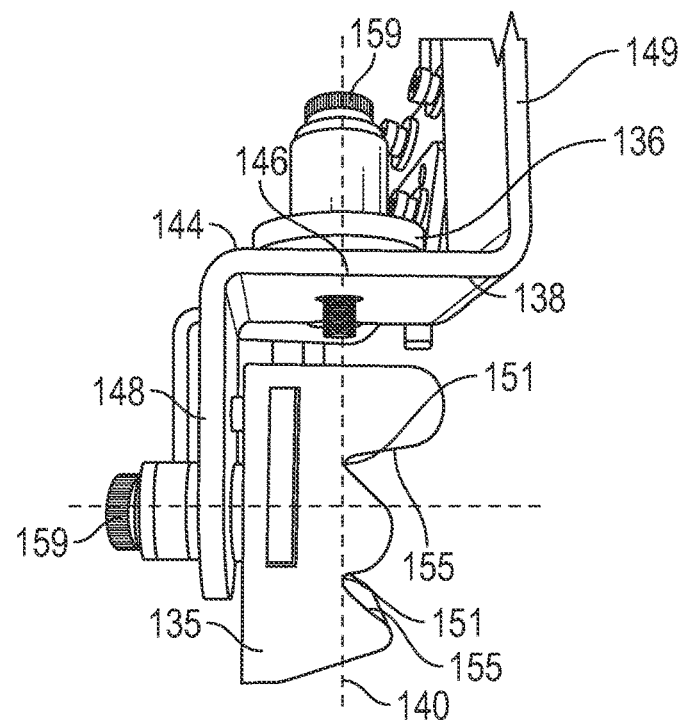
FIG. 5 illustrates a top view of the example self-aligning extension block assembly of FIG. 4.

As shown in FIG. 5, in the example shown, the locator bracket 138 pivots about a first axis 140, and the block 135 pivots about a second axis 142 different from the first axis 140. In some examples, as shown, the first axis 140 and the second axis 142 are transverse to one another. In some examples, the first axis 140 and the second axis 142 are substantially perpendicular to one another (±20 degrees) and not necessarily coplanar.

The example locator bracket 138 includes an L-shaped portion 144 with a first portion 146 of the L substantially perpendicular (±20 degrees) to a second portion 148 of the L. The first portion 146 of the L is pivotably attached to the perch bracket 136, and the second portion 148 of the L pivotably receives the block. A third portion 149 may extend from the first portion 146 at an opposite end from, and in an opposite direction from, the second portion 148. In some examples, this is for balance about the rotational axis of the locator bracket. In some examples, as shown, the first, second, and third portions 146, 148, and 149 are all plate-like in shape. In some examples, as shown, the first, second, and third portions 146, 148, and 149 may be made from one continuous piece of steel.

In some examples, as shown, the axis 140 is transverse to the bottom edges 151 of grooves 153 in the block 135 that are configured to receive the edge of a door or other work object. Applicant has discovered that such a configuration provides optimal self-adjustment in some applications.

In some examples, as shown, shoulder screws 159 extend along the axes 140, 142 to provide pivoting.

Figure 6:
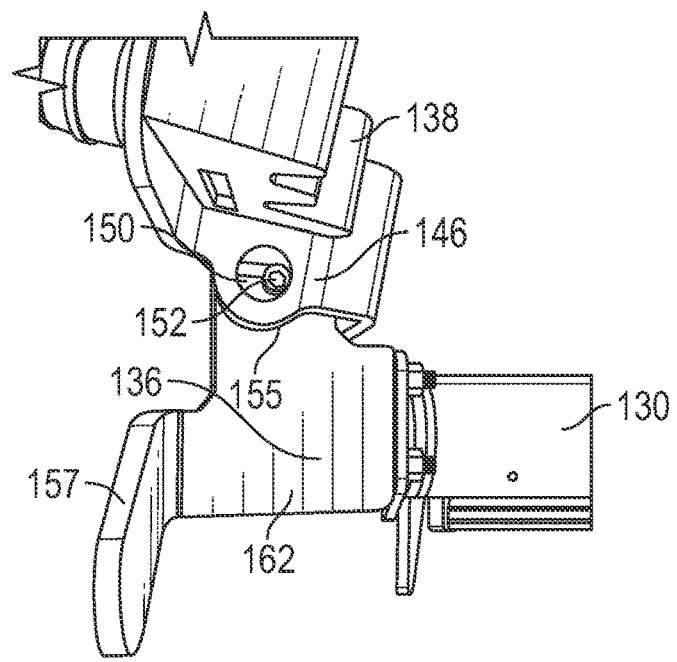
FIG. 6 illustrates another view of the example self-aligning extension block assembly of FIGS. 4 and 5.

As shown in FIG. 6, in the example shown, the first portion 146 of the L includes an opening 150, and the perch bracket 136 includes a protrusion 152 received in, and movable within, the opening 150, to delimit the degrees of freedom of allowable pivot of the locator bracket 138 relative to the perch bracket 136. In the example shown, the opening 150 and the protrusion 152 are both substantially circular in cross section, with the opening 150 having a greater diameter than the protrusion 152. The sizes and locations of the opening 150 and protrusion 152 can be varied to achieve desired degrees of freedom. Of course, other configurations may be utilized, including providing a protrusion in the first portion 146 and an opening in the perch bracket 136 in some examples. In some examples, the protrusion 152 is a screw head or the like.

The example perch bracket 136 includes a base portion 162 and a post portion 155 above the base portion 162, with the post portion 155 pivotably receiving the locator bracket 138. A wing portion 157 may extend from the base portion 162 for an operator to engage to move the slider assembly 130 in some examples.

Figure 7:
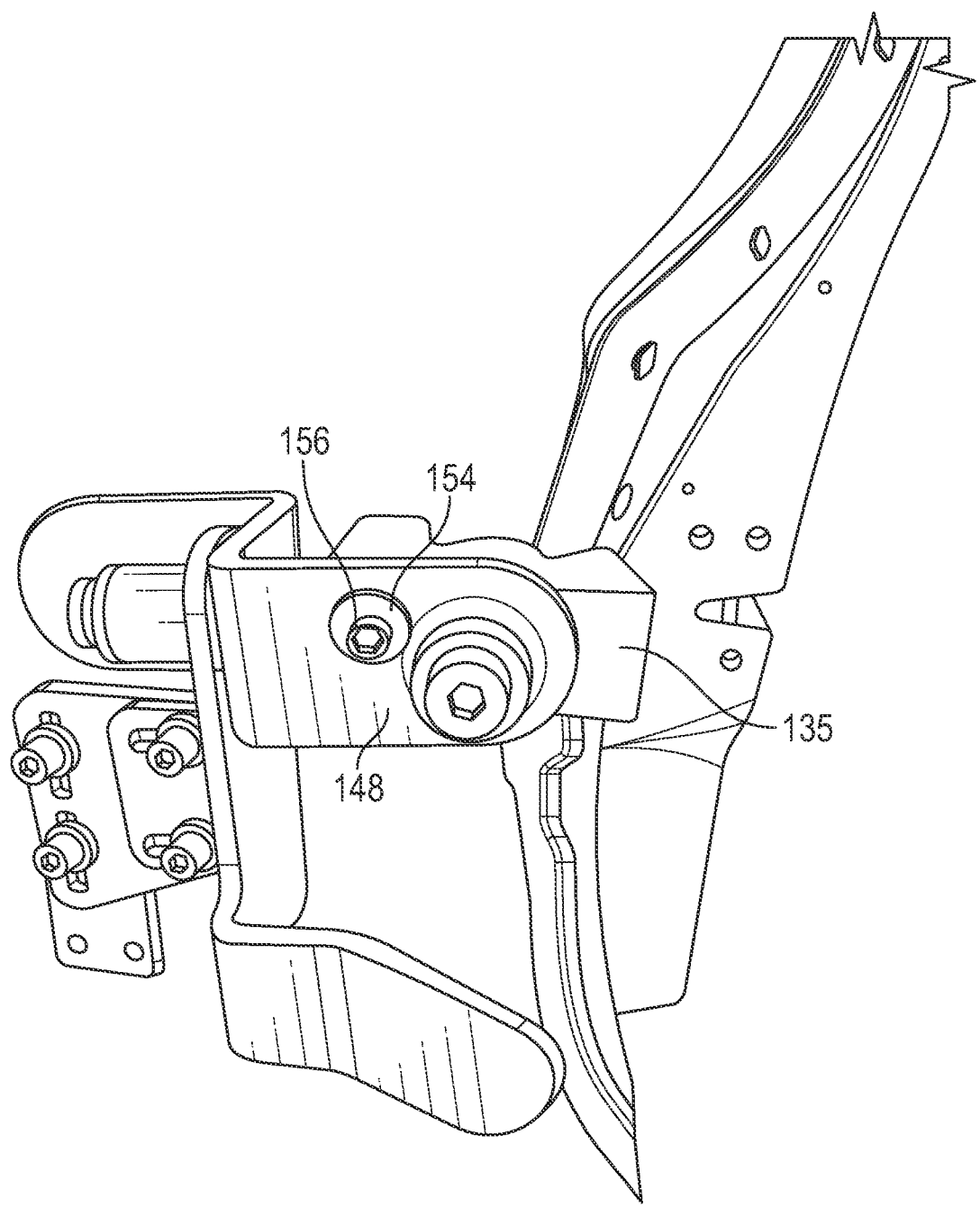
FIG. 7 illustrates another view of the example self-aligning extension block assembly of FIGS. 4-6.
Figure 8:
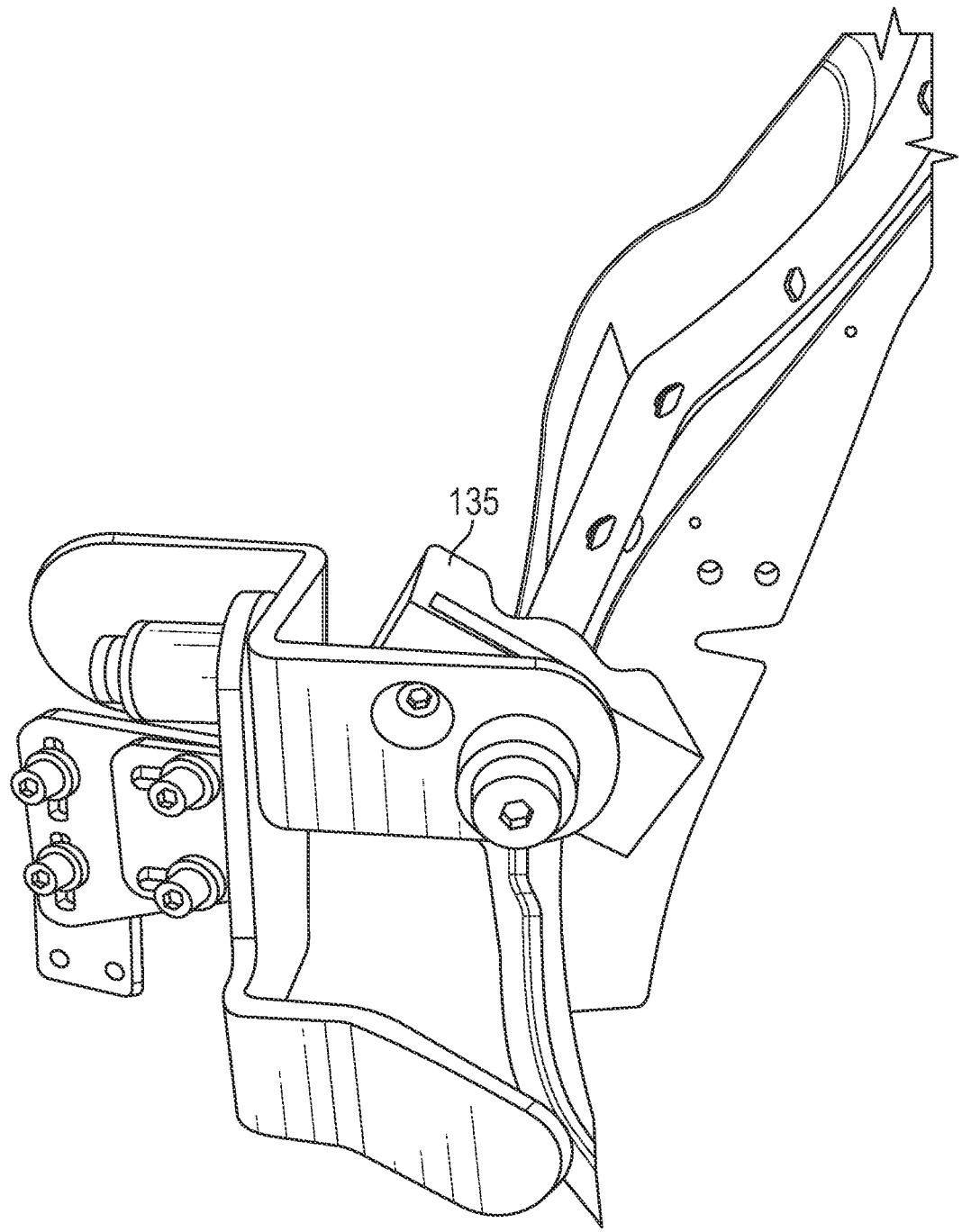
FIG. 8 illustrates another view of the example self-aligning extension block assembly of FIGS. 4-7.

As shown in FIG. 7, the second portion 148 of the L includes a second opening 154, and the block 135 includes a protrusion 156 received in, and movable within, the second opening, to delimit the degrees of freedom of allowable pivot of the block 135 relative to the locator bracket 138. The sizes and locations of the opening 154 and protrusion 156 can be varied to achieve desired degrees of freedom. Of course, other configurations may be utilized, including providing a protrusion in the second portion 148 and an opening in the block 135 in some examples. FIGS. 7 and 8 illustrate the example block 135 at its outer pivot limits. The slider assembly 130 and frame are removed for ease of viewing.

Figure 9:
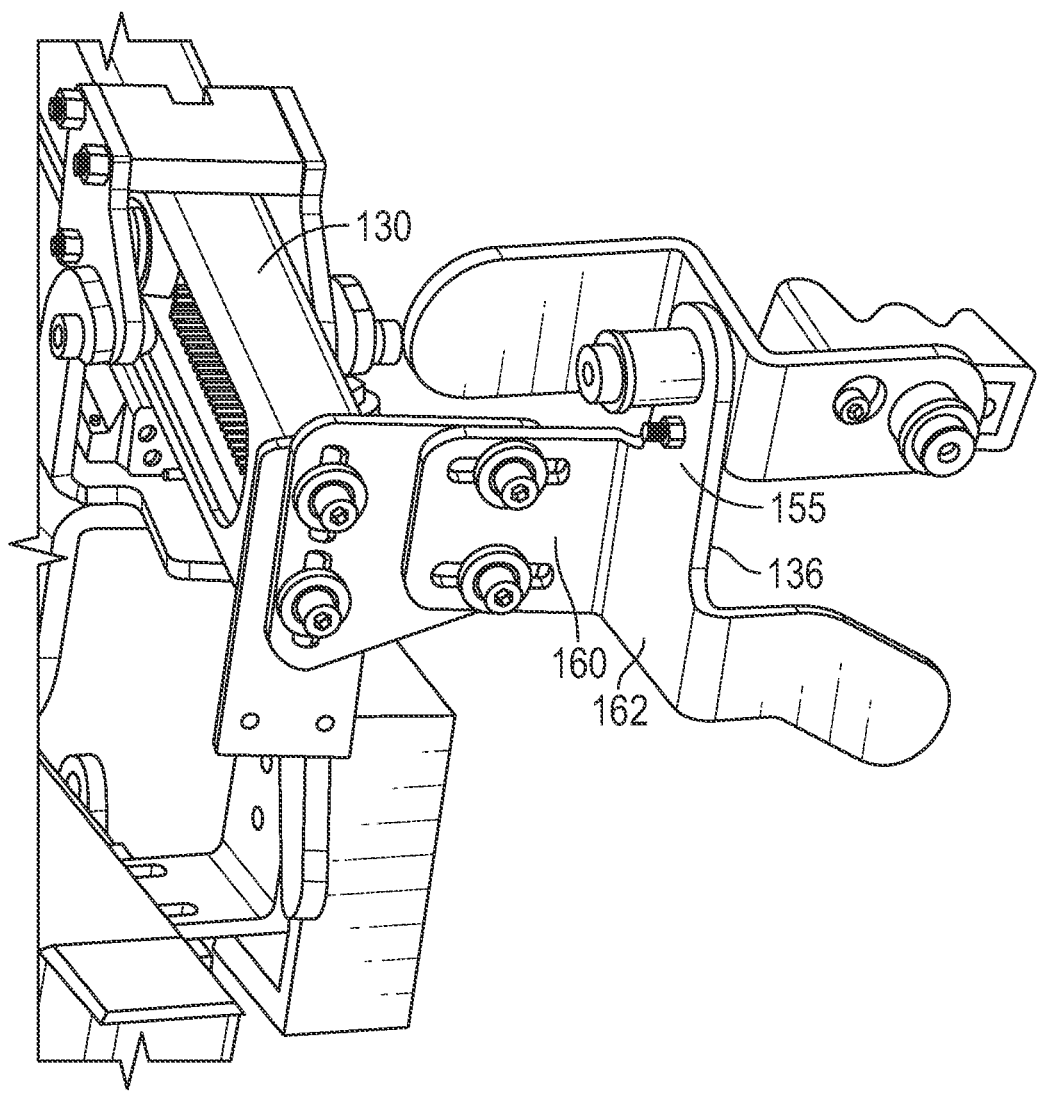
FIG. 9 illustrates another view of the example self-aligning extension block assembly of FIGS. 4-8.

In some examples, as shown in FIG. 9, the perch bracket 136 includes an extender portion 160 that extends from the base portion 162 to offset the post portion 155 from the slider assembly 130.

Figure 10:
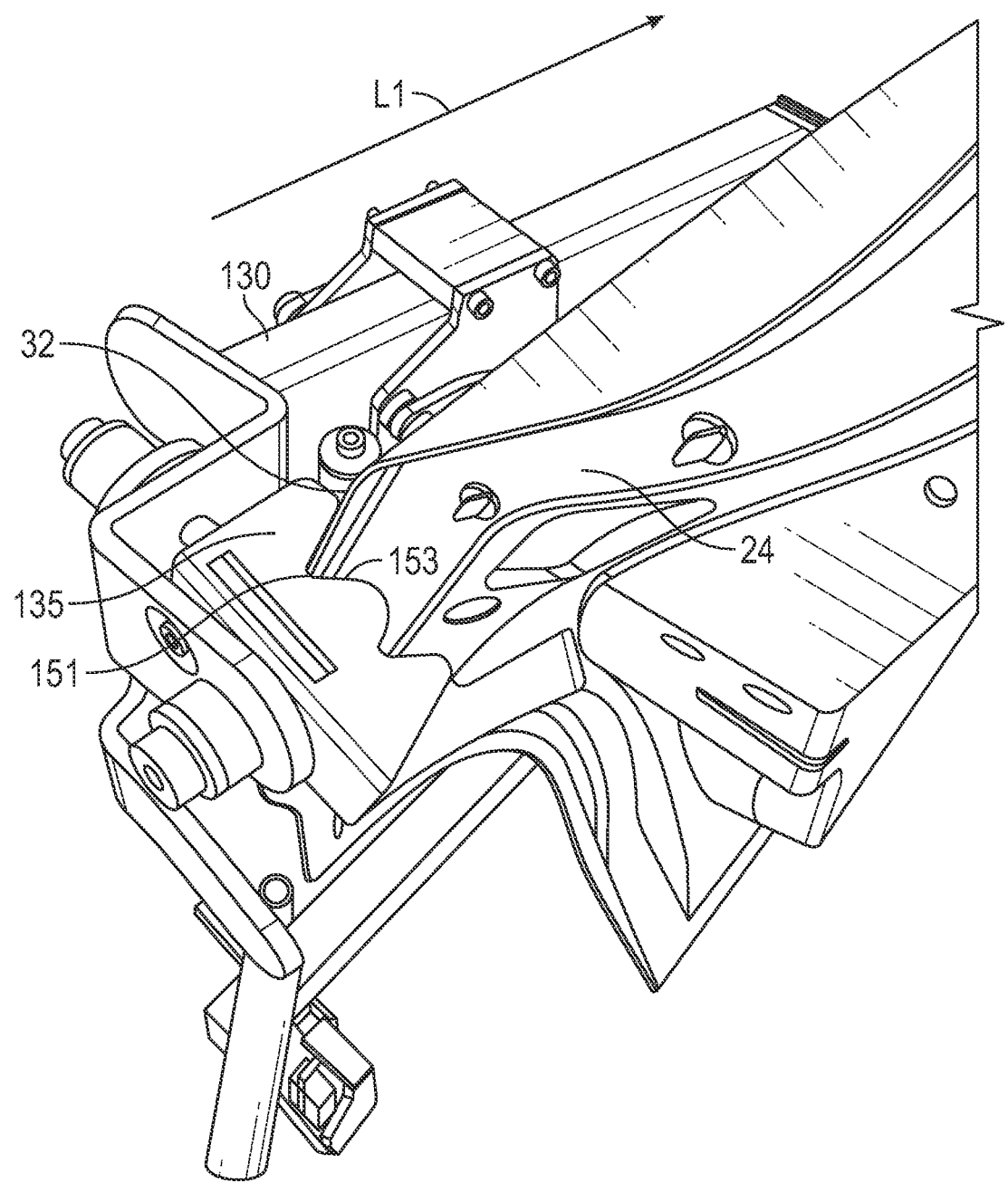
FIG. 10 illustrates another view of the example self-aligning extension block assembly of FIGS. 4-9.

FIG. 10 illustrates the slider assembly 130 in a securing position in which the door is secured by the block 135. Specifically, as the slider assembly is moved in the L1 direction toward the door, the extension block assembly 131 self-aligns the block 135 such that the edge of the door is secured tightly within one of the grooves 153 of the block 135 and against the edge 151 of the groove 153. With multiple components having pivotable degrees of freedom, the extension block assembly 131 self-aligns to secure a door or other work object. Multiple grooves 153 may be provided in a single block 135 in some examples such that an extension block assembly 131 is compatible with multiple door or object types.

A method for supporting a work object can be said to include attaching a slidebox clamp assembly 26 to a frame configured to support the work object, and moving a slider assembly 30/130 of the slidebox clamp assembly 26 linearly such that an extension block assembly 131 of the slider assembly 30/130 self-aligns to receive an edge of the work object in a groove of a block 135.

Although the examples shown relate to supporting vehicle doors, a skilled person having the benefit of this disclosure would realize that the disclosed clamp assemblies would benefit other applications, including general production, assembly, or manufacturing applications.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A work carrier assembly comprising:
a frame for supporting a work object; and
a clamp assembly fixed to the frame, comprising:
a extension block assembly including a perch bracket, a locator bracket pivotably engaged with the perch bracket, and a block pivotably engaged with the locator bracket.

2. The work carrier assembly of claim 1, wherein the block includes a groove configured to receive an edge of the work object.

3. The work carrier assembly of claim 1, wherein the locator bracket pivots about a first axis, and the block pivots about a second axis different from the first axis.

4. The work carrier assembly of claim 1, wherein the locator bracket includes an L-shaped portion having a first plate portion substantially perpendicular to a second plate portion, the first portion pivotably attached to the perch bracket, and the second portion pivotably receiving the block.

5. The work carrier assembly of claim 4, wherein the first plate portion includes an opening, and the perch bracket includes a protrusion received in, and movable within, the opening to delimit the degrees of freedom of allowable pivot of the locator bracket relative to the perch bracket.

6. The work carrier assembly of claim 5, wherein the second plate portion includes a second opening, and the block includes a second protrusion received in, and movable within, the second opening, to delimit the degrees of freedom of allowable pivot of the block relative to the locator bracket.

7. The work carrier of claim 4, the clamp assembly comprising:
a base assembly; and
a slider assembly moveable linearly relative to the base assembly, wherein the extension block assembly extends from the slider assembly.

8. The work carrier assembly of claim 1, wherein the perch bracket includes a base portion, a post portion above the base portion, and a wing portion extending from the base portion, and wherein the post portion pivotably receives the locator bracket.

9. The work carrier assembly of claim 1, wherein the block includes ultra high molecular weight polyethylene or cast urethane.

10. The work carrier of claim 1, the clamp assembly comprising:
a base assembly; and
a slider assembly moveable linearly relative to the base assembly, wherein the extension block assembly extends from the slider assembly.

11. A method for supporting a work object, the method comprising:
attaching a clamp assembly to a frame configured to support the work object; and
moving a slider assembly of the clamp assembly linearly such that an extension block assembly of the slider assembly self-aligns to receive an edge of the work object in a groove of a block, wherein the extension block assembly includes a perch bracket and a locator bracket pivotably engaged with the perch bracket, and the block is pivotably engaged with the locator bracket.

12. The method of claim 11, wherein the work object is a door.

13. The method of claim 11, wherein the block includes a groove configured to receive an edge of the work object.

14. The method of claim 11, wherein the locator bracket pivots about a first axis, and the block pivots about a second axis different from the first axis.

15. The method of claim 11, wherein the locator bracket includes an L-shaped portion having a first plate portion substantially perpendicular to a second plate portion, the first portion pivotably attached to the perch bracket, and the second portion pivotably receiving the block.

16. The method of claim 15, wherein the first plate portion includes an opening, and the perch bracket includes a protrusion received in, and movable within, the opening to delimit the degrees of freedom of allowable pivot of the locator bracket relative to the perch bracket.

17. The method of claim 16, wherein the second plate portion includes a second opening, and the block includes a second protrusion received in, and movable within, the second opening, to delimit the degrees of freedom of allowable pivot of the block relative to the locator bracket.

18. A work carrier assembly comprising:
    a frame for supporting a work object; and
    a clamp assembly fixed to the frame, comprising:
        a base assembly;
        a slider assembly moveable linearly relative to the base assembly; and
        a extension block assembly extending from the slider assembly and including a perch bracket, a locator bracket pivotably engaged with the perch bracket about a first axis, and a block pivotably engaged with the locator bracket about a second axis different from the first axis, the block including a groove configured to receive an edge of the work object.

19. The work carrier assembly of claim 18, wherein the locator bracket includes an L-shaped portion having a first plate portion substantially perpendicular to a second plate portion, the first portion pivotably attached to the perch bracket, and the second portion pivotably receiving the block.

20. The work carrier assembly of claim 19, wherein
    the first plate portion includes an opening, and the perch bracket includes a protrusion received in, and movable within, the opening to delimit the degrees of freedom of allowable pivot of the locator bracket relative to the perch bracket, and
    the second plate portion includes a second opening, and the block includes a second protrusion received in, and movable within, the second opening, to delimit the degrees of freedom of allowable pivot of the block relative to the locator bracket.

* * * * *